United States Patent [19]

Nugent

[11] 4,424,831
[45] Jan. 10, 1984

[54] VALVE CONSTRUCTION HAVING ENHANCED DUTY CYCLE

[75] Inventor: William P. Nugent, So. Salem, N.Y.

[73] Assignee: Pneumadyne, Inc., Croton Falls, N.Y.

[21] Appl. No.: 281,032

[22] Filed: Jul. 7, 1981

[51] Int. Cl.³ ............................................. F16K 11/14
[52] U.S. Cl. .................................................. 137/627.5
[58] Field of Search ................... 137/627.5; 303/52, 54

[56] References Cited

U.S. PATENT DOCUMENTS 3,006,657 10/1961 Augustin ...................... 137/627.5 X
3,071,394 1/1963 Miller ........................... 137/627.5 X
3,371,686 3/1968 Bueler ............................... 137/627.5
3,768,370 10/1973 Lewis ........................... 137/627.5 X Primary Examiner—Robert G. Nilson
Attorney, Agent, or Firm—Mark T. Basseches; Paula T. Basseches

[57] ABSTRACT

The present invention is directed to a three way valve having particular utility as an air control valve and providing an enhanced duty cycle. A characterizing feature of the valve resides in the construction and arrangement whereby the valve plunger is, in all conditions of operation, slidably guided for precise axial movement in a bore whereby any tendency of the plunger to tilt or cant, with accompanying damage or scarring of internal elements of the valve structure, is positively prevented.

1 Claim, 5 Drawing Figures

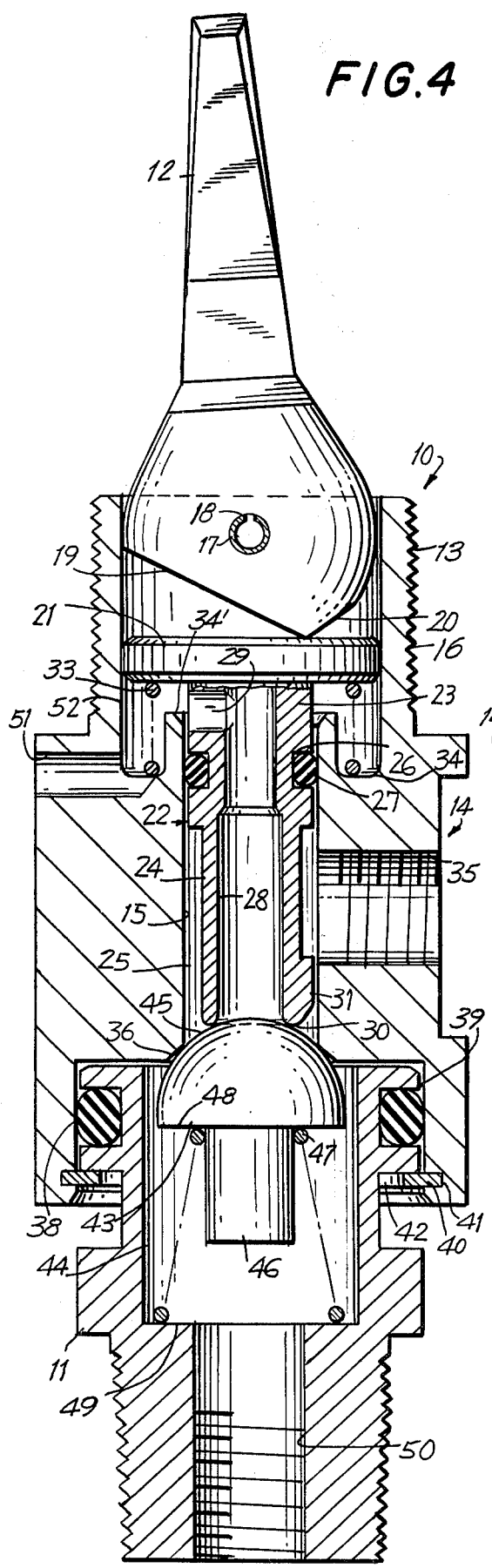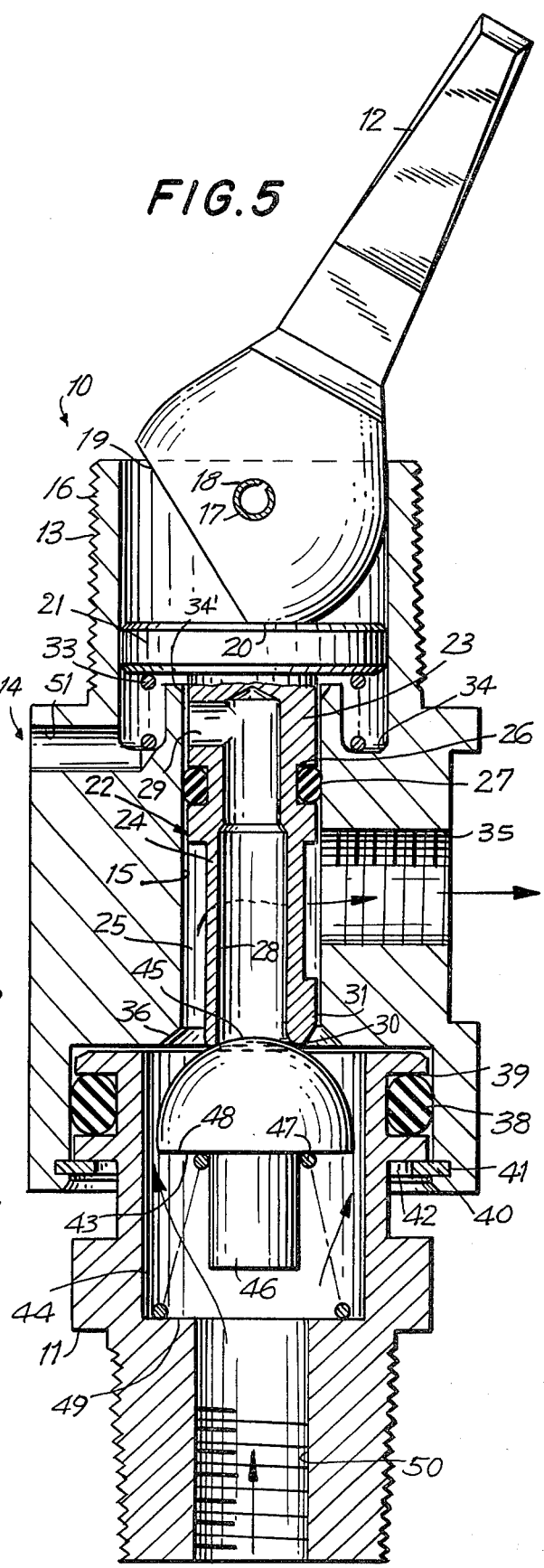

VALVE CONSTRUCTION HAVING ENHANCED DUTY CYCLE

BACKGROUND OF THE INVENTION

1. Field of the Invention

The present invention is in the field of valve constructions and is more particularly directed to a three way valve shiftable between three conditions of operation, namely, a condition in which air from a load (pneumatically operated device) is vented to an exhaust port, a condition in which air from a supply port is connected to the load, and an intermediate condition in which all flow through the valve is blocked.

2. The Prior Art

Numerous valve constructions are currently available which are adapted by manual or automatic operation selectively to vent a load to atmosphere or, alternatively, by actuation of the valve, to connect the load to a source of air under pressure.

Typically such valves include a shiftable plunger, a supply port, an exhaust port or passage, and a load port. In the normal operative condition the load is vented through the exhaust port. When such valves are actuated by shifting the plunger, the components move progressively to an intermediate position whereat all ports are sealed, and then to a final position whereat the supply pressure is connected to the load.

Movements from the described normal to the charging position in valve devices heretofore known have embodied two distinct actions which have greatly reduced the useful life cycle of the valve. In typical constructions, the plunger carries an O-ring which, in the course of movement of the plunger from the normal to the charging position is caused to enter into a bore or channel to effect a seal, whereby the source of pressurized air is prevented from passing axially along the length of the plunger and outwardly through the vent port. The constant entry of the O-ring into a sealing relation with the bore progressively induces wear of the O-ring, whereby after a relatively limited duty sequence a leakage path developes about the O-ring, necessitating disassembly of the valve and replacement of the O-ring or, more usually, discarding of the valve and substitution of a new valve.

A second area of premature valve compromise inherent in prior art devices occurs at the entrance of the supply port to the valve. In valve constructions heretofore known and in the valve of the instant invention, the supply port, in the normal position, is blocked by a sealing member. In the course of the initial movements of the plunger from the normal to the charging position thereof, after the above described O-ring sealing action is effected, a distal end of the plunger unseats the seal component from its blocking relation of the supply port.

In the past, however, plungers have not been provided with means for accurately guiding the same to assure a precise axial movement thereof, with the result that tilting of the plunger causes the distal end to scrape either against the valve seat at the supply port or to engage against the supply port seal in an uncontrolled manner. The resultant gouging of the seat or of the sealing member has resulted in the creation of a leakage path, whereby air is permitted to pass through the supply port in all operating conditions of the valve. Obviously, such action is wasteful of energy and often interferes with the effective operation of the air controlled device.

Further deficiencies of known valve devices include back blast or venting through the actuator button or mechanism, long prestroke, tendency to chatter, and the provision of a restricted flow path from the load to the atmosphere.

SUMMARY

The present invention may be summarized as directed to an improved three way valve device. A characterizing feature of the device is that the valve plunger is guided for precise axial movement throughout all conditions of operation without exerting lateral forces on the O-ring whereby the distal end of the valve unseats the seal at the supply port without any tendency to damage the seal or the seat, and damage to or deformation of the O-ring is prevented.

The device is further characterized by the provision adjacent the vent end of the plunger of an O-ring seal which is at all times disposed within the plunger guide passage. In this manner the shearing action on the O-ring which occurs in valve constructions heretofore known when the O-ring enters into the passage is avoided. The plunger of the device is separated from the plunger actuator button or toggle whereby tilting forces cannot be transmitted to the plunger.

The improvements noted are accomplished in the valve device of the invention by the provision at the upper end of the plunger of a guide head member sliding in a bore at a level above the O-ring and by the provision at the lower end of the plunger of a series of radially extending spaced fins or ribs in sliding engagement with the guide bore whereby the plunger is supported at two spaced positions and forced to move in a precisely defined axial path, removing all guiding functions from the O-ring, which remains at all times in the guide bore.

The plunger includes a central internal passage through which air is vented, which passage terminates at a level above the upper seal of the plunger.

Valves in accordance with the invention have been tested and found to operate through millions of cycles without any leakage or compromise in operation. Continued cycling tests have as yet not given an accurate indication of the ultimate life cycle of the valve. In contrast, it is unusual for conventional valves to operate through as many as two hundred thousand cycles without giving evidence of significant leakage.

The valve evinces no tendency to chatter, operates with a short prestroke, provides a large flow path from load to atmosphere, and is essentially free of back blast.

It is accordingly an object of the invention to provide a valve device which is capable of an extremely extended and leakproof duty cycle.

It is a further object of the invention to provide a valve of the type described which has a positive action, with a sharp cutoff in shifting between the various conditions of operation, and which is simple to construct and repair.

Still further objects of the invention reside in the provision of a valve of the type described which may be operated by a short stroke actuator mechanism which evinces no tendency to chatter, which provides a large area flow path from load to atmosphere, and which vents through a separate vent or exhaust port rather than through the valve actuator mechanism.

To attain these objects and such further objects as may appear herein or be hereinafter pointed out, reference is made to the accompanying drawings, forming a part hereof, in which:

FIG. 4 is a view similar to FIG. 2 showing the position of the valve components in an intermediate or "all ports blocked" position;

FIG. 5 is a view similar to FIG. 4 showing the position of the parts in the charging condition of the valve.

Figure 1:
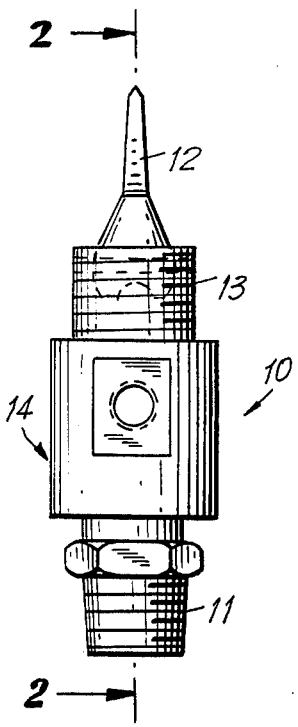
FIG. 1 is a side elevational view of a valve in accordance with the invention.

Referring now to the drawings, there is shown a valve 10 which includes at its lower end a nipple 11 adapted to be connected to a source of air under pressure. An operating lever or toggle 12 is positioned in the upper end 13 of the valve body 14. While the device has been illustrated in conjunction with a lever actuator 12, it will be readily recognized that any actuating means capable of exerting an axial force on the operating components of the valve may be suitably substituted. By way of example and without limitation, the valve could be operated by a button, by a cam driven mechanism, by a solenoid, etc.

Figure 2:
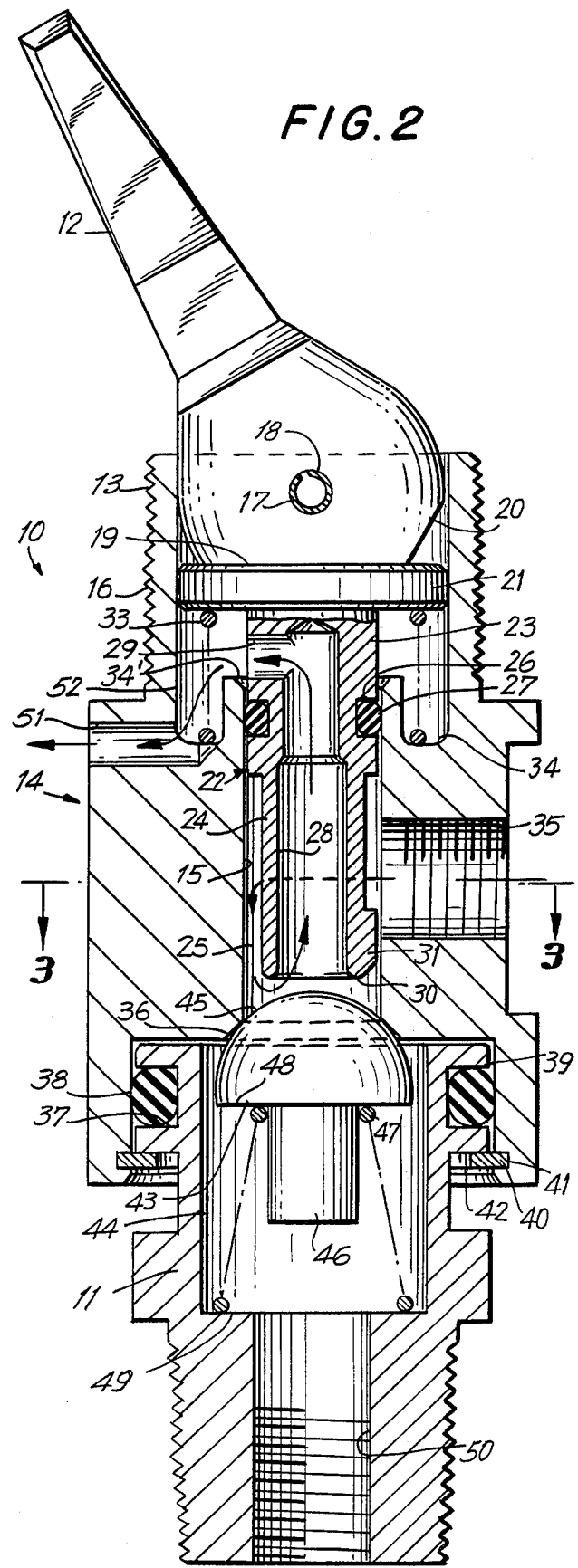
FIG. 2 is a magnified section taken on the line 2—2 of FIG. 1 showing the valve components in the normal or venting position.

Referring more particularly to FIG. 2, the valve body 14 includes an internal, axially directed bore 15. The upper end 13 of the valve body may include a threaded portion 16 to facilitate panel mounting.

In the illustrated embodiment, the lever member 12 is supported by a cross shaft 17 which may be in the form of a spring loaded carrier pin, the distal ends of which are mounted in diametrically opposed apertures (not shown) in the upper end portion 13 of the body. It will be observed that the pin 17 provides a bearing about which cross aperture 18 in the lever 12 may rotate.

The lever is provided with two flats, notably 19 and 20, which are located progressively further from the radius of the pin. The flats 19, 20 selectively engage against the guide head 21 of the plunger assembly 22, it being appreciated that where the flat 19 is engaged against the head 21, the plunger is at a higher position within the bore 15 than is the case when flat 20 is so engaged (see FIG. 5).

The plunger assembly 22 includes, in addition to the guide head portion 21, a generally cylindrical body portion 23, the lower end segment 24 of which is of lesser diameter than the bore 15, thereby defining between the noted parts an annular passage 25.

The plunger assembly 22, in the area of the body portion 23, includes an annular groove 26 forming a seat for O-ring 27 which forms a tight sliding fit within the bore 15. The ring may move or be compressed slightly in a lateral direction within groove 26, as is typical. The plunger 22 includes an axially directed discharge bore 28, terminating adjacent the head 21. A cross or air vent aperture 29 is formed in the plunger adjacent its upper end. The plunger assembly 22 includes a depending mouth portion 30 at the lower end of the discharge bore 28.

Figure 3:
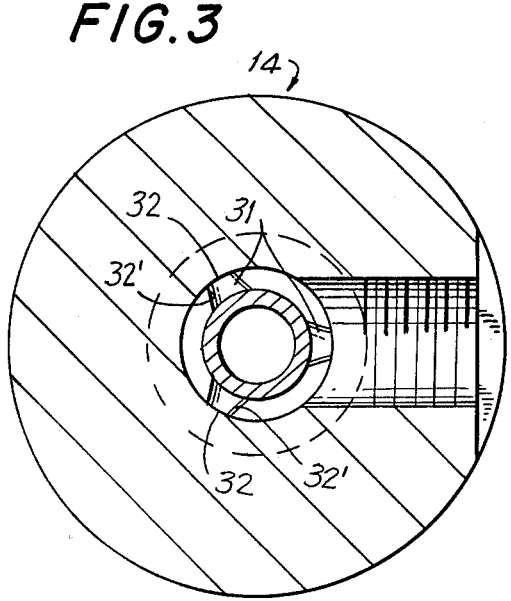
FIG. 3 is a section taken on the line 3—3 of FIG. 2.

As best perceived from FIG. 3, the plunger assembly includes a plurality of radially extending fins or ribs 31 surrounding and upwardly disposed relative to the mouth 30. The radial outermost ends 32 of the fins are preferably arcuate in transverse section and intimately engage the walls of the bore 15. Preferably, the side edges 32' of the fins are concave, to increase the passage between fins.

The term "fins" as used herein should be broadly construed to encompass, for instance, a disc having a periphery slidingly engaging the bore 15 and having axial by-pass apertures.

A coil spring member has its upper and lower ends biased between the undersurface of the plunger head 21 and an upwardly facing shoulder 34 in the valve body whereby the plunger assembly is urged upwardly into engagement with the flat 19 of the operating lever 12. The body includes an upwardly facing annular stop shoulder 34' which lies in the path of the underface of guide head 21 to define a downward limit therefor.

The valve body 14, at an intermediate position, is provided with a radially directed load port 35. The body 14 includes a depending valve seat 36 which is downwardly directed and preferably beveled or chamfered.

The nipple assembly 11 includes an internal groove 37 supporting O-ring 38 whereby a tight seal is defined with the enlarged bore portion 39 of the valve body 14. The nipple assembly 11 is connected to the valve body 14 by a snap washer 40, portions of which enter into complemental grooves 41, 42 in the body and nipple assembly, respectively.

A valve seal 43 of yieldable resilient material, preferably elastomeric, is mounted in an enlarged bore 44 in the nipple assembly. The valve seal 43 is preferably mushroom-shaped, including a parti-spherical or dome-shaped upper end portion 45 and a stem-shaped lower portion 46. A valve spring 47, which is frusto-conic in vertical section, biases portions of the dome member 45 into contact with the valve seat 36. More particularly, spring 47 includes an upper end biased against undersurface 48 of the valve seat, the lowermost end of the spring 47 engaging against an upwardly directed shoulder 49 in the nipple assembly 11.

The operation of the device will be apparent from the preceding description, it being understood that in normal operation the intermediate port will be connected to a load, such as a pneumatic device to be cyclically connected to a source of air under pressure, and a source of compressed air is connected to the valve via passage 50 formed in the nipple 11. A discharge port 51 is formed in the upper end of the valve body 14 in registry with the enlarged bore 52, within which the head 21 of the plunger assembly 22 rides.

In the position of FIG. 2 it will be evident that air is permitted to vent through portion 51 from the load to the atmosphere (or to a conduit connected to discharge port 51). The air escaping from the load flows downwardly through the annular passage 25, upwardly through the discharge bore in the plunger, and outwardly through the aperture 29 into bore 52, and outwardly through the said discharge port 51. It should be noted that air flows downwardly through the spaces defined between the radially extending fins 31 to reach the interior of the discharge bore.

It will further be noted that air is not free to pass upwardly beyond the O-ring 27 and that the said O-ring remains at all times within the bore 15. The air path is shown by the arrows, FIG. 2. Due to the close clearances between the periphery of guide head 21 and guide bore 52, back blast through the toggle opening is minimized.

When it is desired to introduce air from the supply port 50 to the load port 35, the plunger is shifted from the position in FIG. 2 whereat flat 19 engages head 21, to the position of FIG. 5, whereat flat 20 is engaged against the head. In the course of such movement, the valve components pass through intermediate position illustrated in FIG. 4 wherein all flow through the valve is blocked.

Since the toggle (or a button assembly) forms a separate component, i.e. is not physically attached to the plunger, side forces tending to cant the plunger are minimized or eliminated.

As will be seen from an inspection of FIG. 4, partial tilting movement of the lever member 12 has urged the plunger assembly 22 downwardly to a position at which the mouth 30 seats on the dome-shaped surface 45 of the valve seal 43. In this position air from the supply port is blocked from flowing by the still seated valve seal, being engaged against the valve seat 36. Air from the load is blocked from flowing to the discharge passage 28 by the noted engagement between the mouth 30 and dome surface 45.

Continued movement of the lever 12 from the position of FIG. 4 to the position of FIG. 5 results in a still further downward shifting of the plunger assembly 22. Such further downward movement causes the valve seal 43 to be shifted downwardly by its engagement with mouth 30 so as to space the seal from the seat 36. In this position of operation, air from the supply port 50 is permitted to flow upwardly through passage 44 and across the annular gap defined between the surface of the dome and the valve seat 36. The flow path to the load port 35 is, as shown by the arrows, FIG. 5, upwardly through the spaces between the annular fins 31 and into the annular chamber 25 between the bore 15 and reduced diameter segment 24 of the plunger assembly.

When the desired amount of air has been admitted, the lever is returned to the position of FIG. 2, in each instance passing through the complete blocked position of FIG. 4.

From the foregoing description it will be seen that the plunger assembly 22 is at all times guided for accurate axial movement relative to the bore 15. This highly desirable axial guiding effect results from supporting the plunger body against tilting at two spaced points, notably by the sliding engagement of head 21 in bore 52 at the upper end of the plunger assembly at a level above the O-ring, and the sliding engagement of the fins 31 and bore 15 adjacent the lower end of the plunger assembly. By thus accurately guiding the movements of the plunger assembly independently of the O-ring, there is no possibility for the lower ends of the plunger stem to scar the portions defining the seal with the valve seal member 43, or for lateral forces to distort the O-ring. Such arrangement is in direct contrast with constructions heretofore known wherein considerable lateral play is possible, with consequent damage to the O-ring.

The fact that the O-ring is not removed from and reintroduced into the bore during cycling (as is the case in prior art constructions) greatly increases the life of the ring. The fact that the O-ring remains in the bore enables valve actuation with a short prestroke in contrast to prior art devices wherein initial movements are required to place the O-ring in sealing position.

By providing an internal flow path through the plunger rather than through a narrow annular gap opened by movement of the plunger, the restrictions existing in prior art devices are avoided.

The provision of an internal flow path and the positive connection between the various operating components eliminate the possibility of chatter.

From the foregoing it will be appreciated that there is provided an improved three way valve device having long life characteristics. The valve device obviates deficiencies present in the prior art which prematurely compromise, through scraping and shearing effects, the seal provided by such valves.

It will be apparent to those skilled in the art that numerous structural changes may be made from the detailed assembly hereinabove described without departing from the spirit of the invention. Accordingly the same is to be broadly construed within the scope of the appended claims.

Having thus described and invention and illustrated its use, what is claimed as new and is desired to be secured by Letters Patent is:

1. A three way valve member comprising a valve body having an axially extending guide bore including an enlarged diameter portion, a supply port adjacent a lower end of said body, an exhaust port adjacent the upper end of said body, and a load port intermediate said body, each said port being in communication with said bore, said exhaust port communicating with said enlarged diameter portion of said bore, a plunger member mounted in said bore and shiftable toward and away from said supply port, said plunger member including a peripheral portion spaced from said bore, spring means urging said plunger member away from said supply port, said plunger member including an axially extending discharge bore having a downwardly directed open mouth at the lower end thereof and a vent aperture adjacent the upper end thereof above said exhaust port, a plurality of mutually spaced, radially extending fin members on said plunger member having distal portions in sliding engagement with said guide bore, an annular seal member interposed between said guide bore and the periphery of said plunger member at a heightwise location above said fin members and defining a slidable seal between said plunger member periphery and guide bore at a position below said vent aperture, a guide head member on said plunger member at a position above said annual seal member, said guide head member being guided for movement axially of said bore by sliding engagement with said enlarged diameter portion of said bore, the undersurface of said head member and enlarged diameter portions of said bore defining a chamber communicating with said vent aperture and said exhaust port, a resilient valve seal disposed in said supply port, said seal including a seal surface having portions yieldably urged into blocking position of said supply port, and actuator means for shifting said plunger member between first, second and third progressively lower operative positions within said guide bore, said plunger member, in said first position, defining a flow path between said intermediate and exhaust ports downwardly through the spaces between said fin members, upwardly through said discharge bore, and outwardly through said vent aperture, said plunger member in said second position having said mouth portion in sealing engagement with surfaces of said valve seal whereby all flow between said ports is blocked, said plunger member in said third operative position unseating said valve seal from said supply port while maintaining said mouth in sealing engagement with said seal surface, thereby to communicate said supply and intermediate ports via a flow path extending through the spaces between said fin members and the space between said guide bore and the periphery of said plunger member, the force require to move said plunger member from said second to said first position being supplied, at least in part, by the pressure of air emerging from said intermediate port, entering said chamber, and bearing against said undersurface of said head member.

* * * * *